Dec. 17, 1957  D. W. SHIMWELL  2,816,576
LOOMS FOR WEAVING
Filed Aug. 2, 1954  17 Sheets-Sheet 1
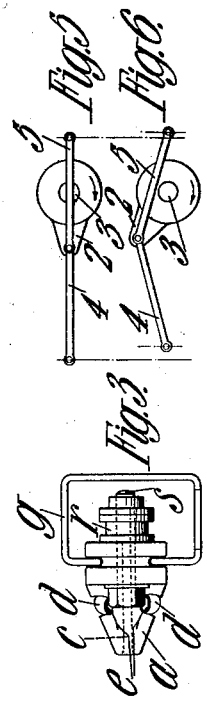
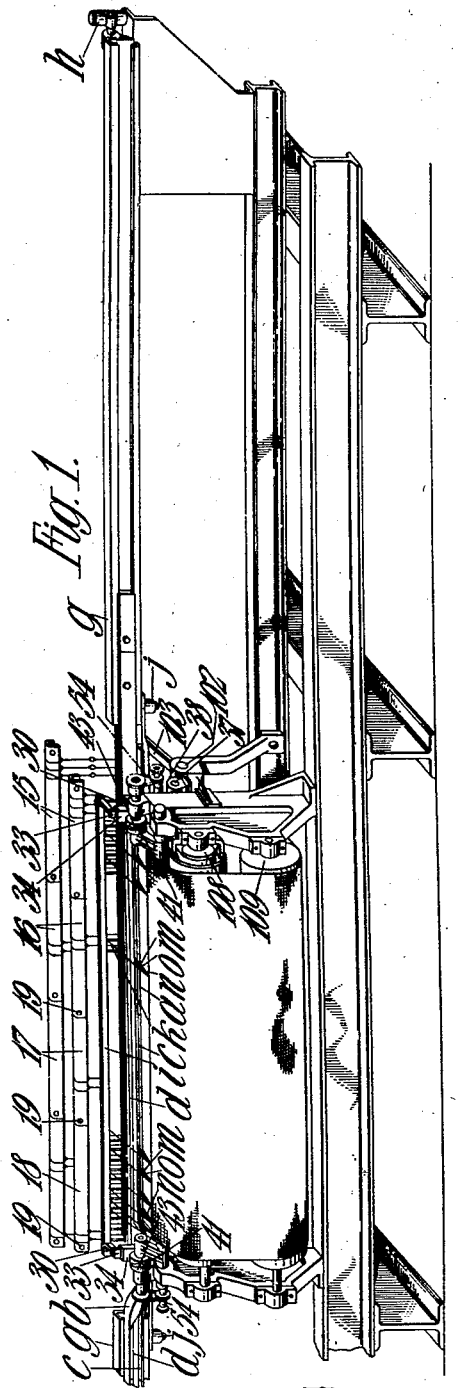
Inventor
D. W. Shimwell
By Glascock Downing Seebold Attys.

Dec. 17, 1957 D. W. SHIMWELL 2,816,576
LOOMS FOR WEAVING
Filed Aug. 2, 1954 17 Sheets-Sheet 2
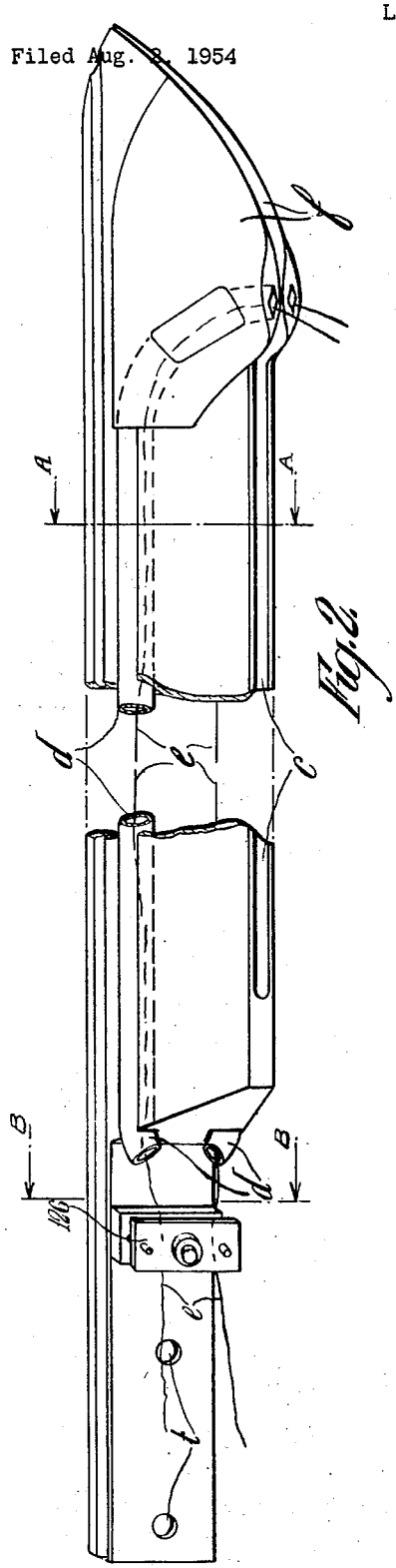
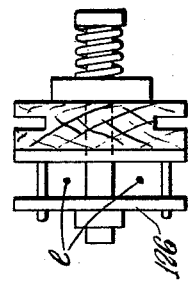
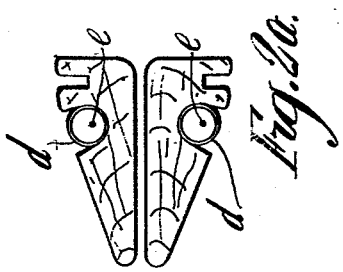
Inventor
D. W. Shimwell

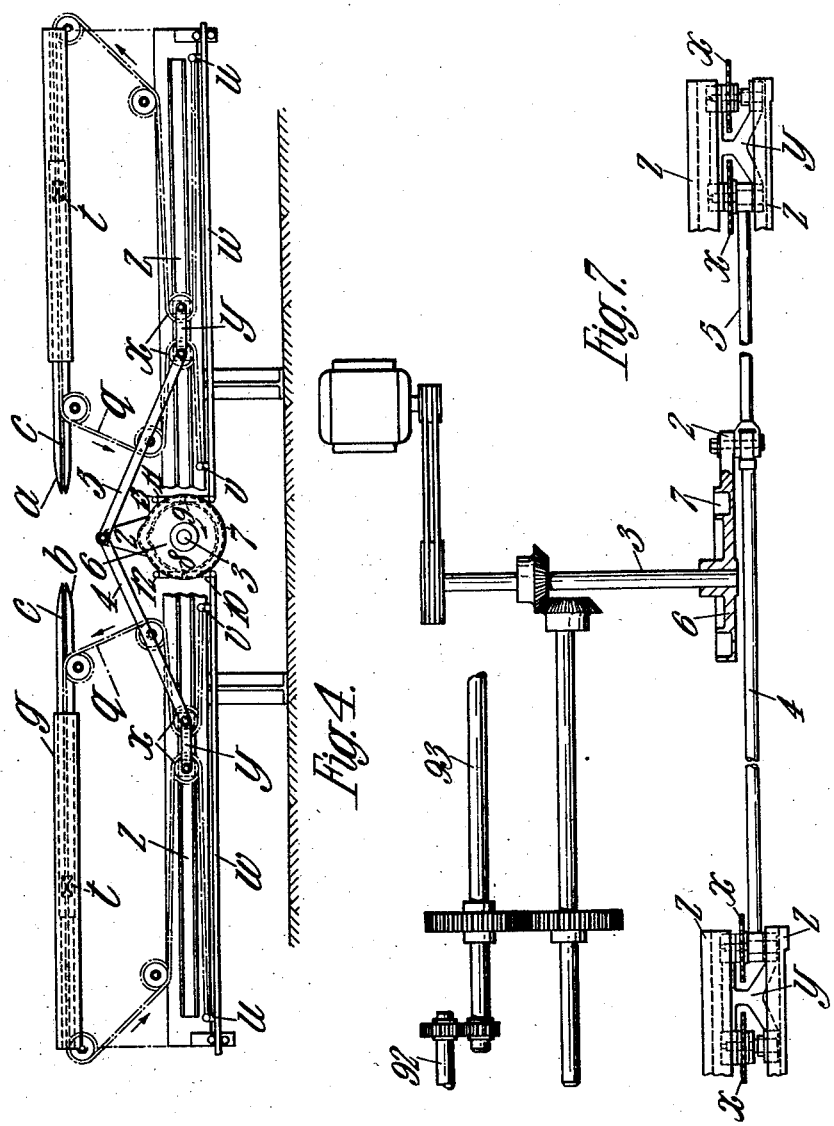

Dec. 17, 1957　　　D. W. SHIMWELL　　　2,816,576
LOOMS FOR WEAVING
Filed Aug. 2, 1954　　　17 Sheets-Sheet 4
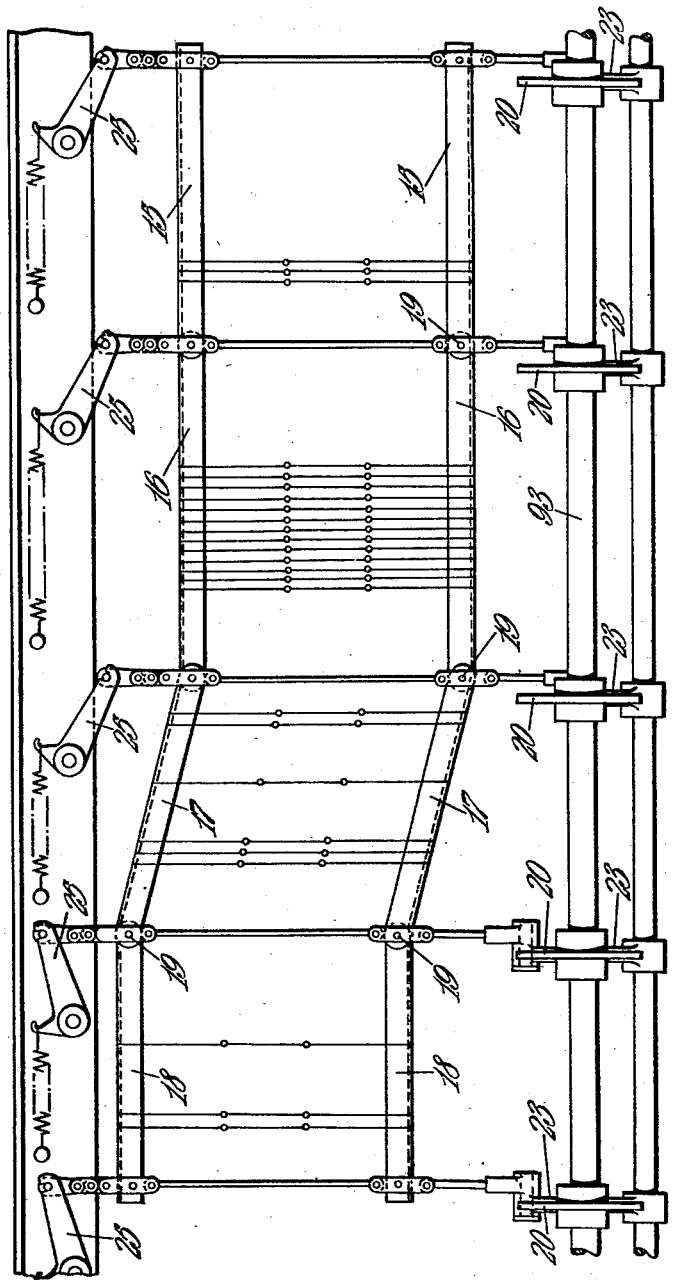
Inventor
D. W. Shimwell

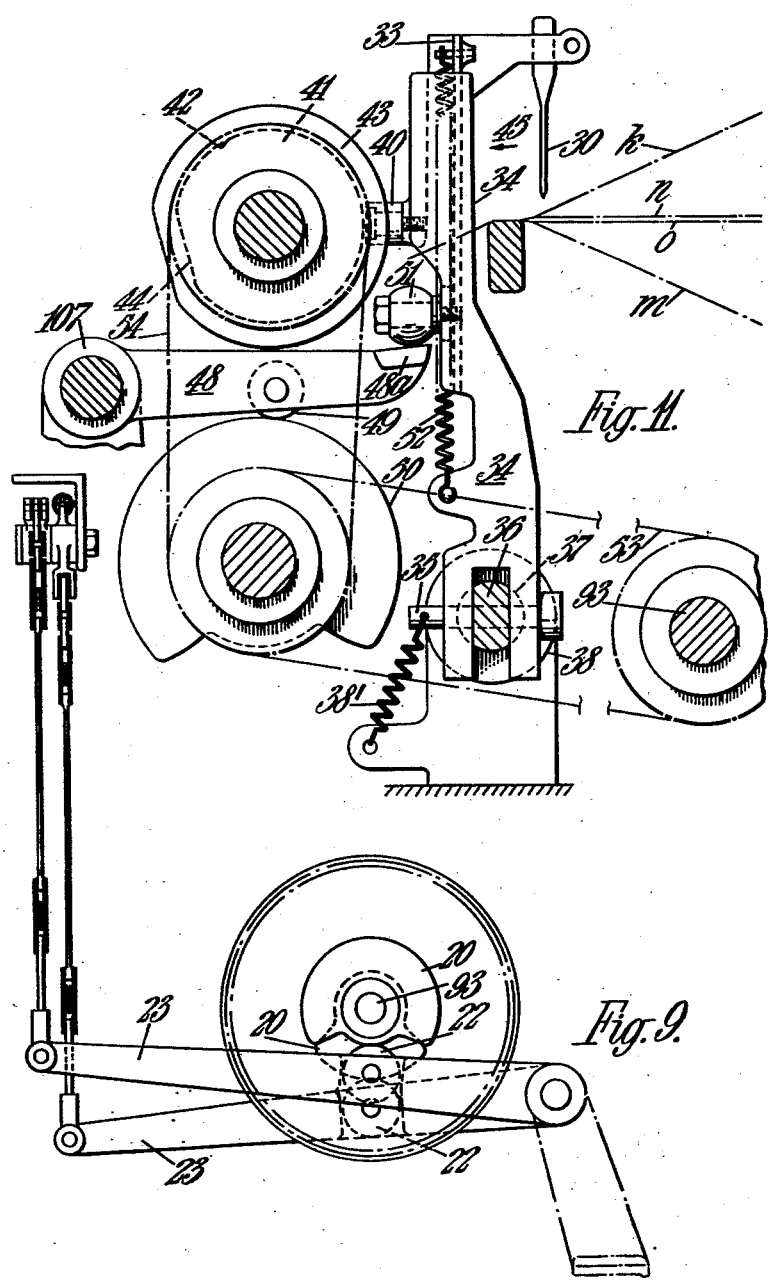

Dec. 17, 1957 D. W. SHIMWELL 2,816,576
LOOMS FOR WEAVING
Filed Aug. 2, 1954 17 Sheets-Sheet 6
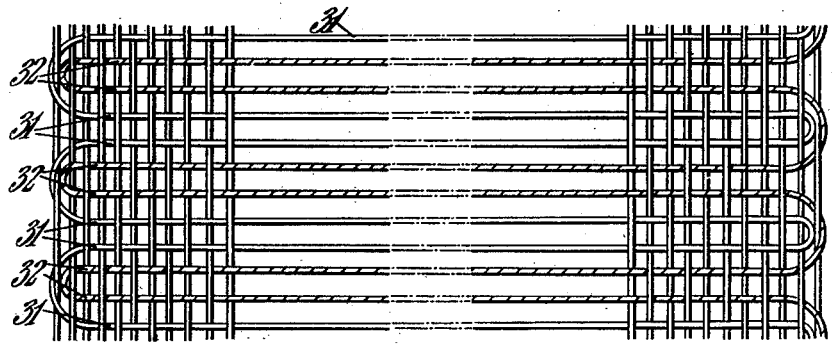
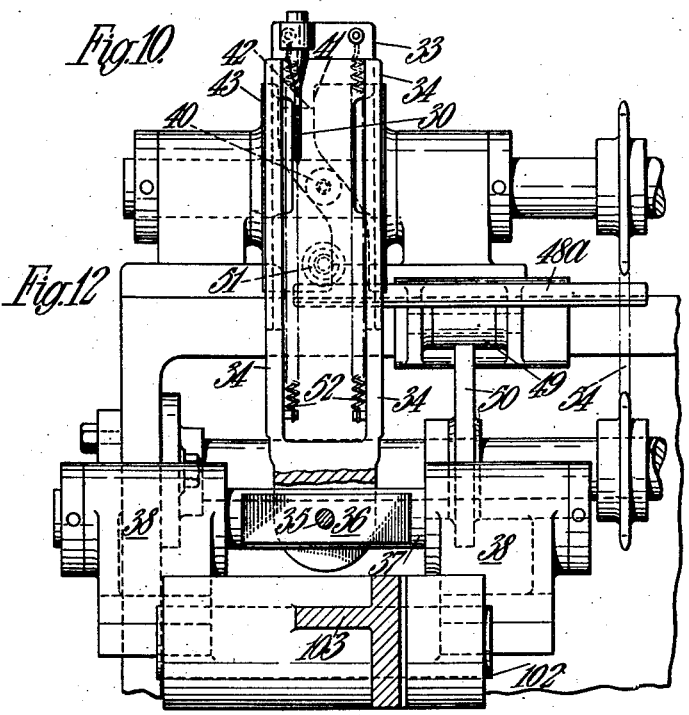
Inventor
D. W. Shimwell Dec. 17, 1957 D. W. SHIMWELL 2,816,576
LOOMS FOR WEAVING
Filed Aug. 2, 1954 17 Sheets-Sheet 7
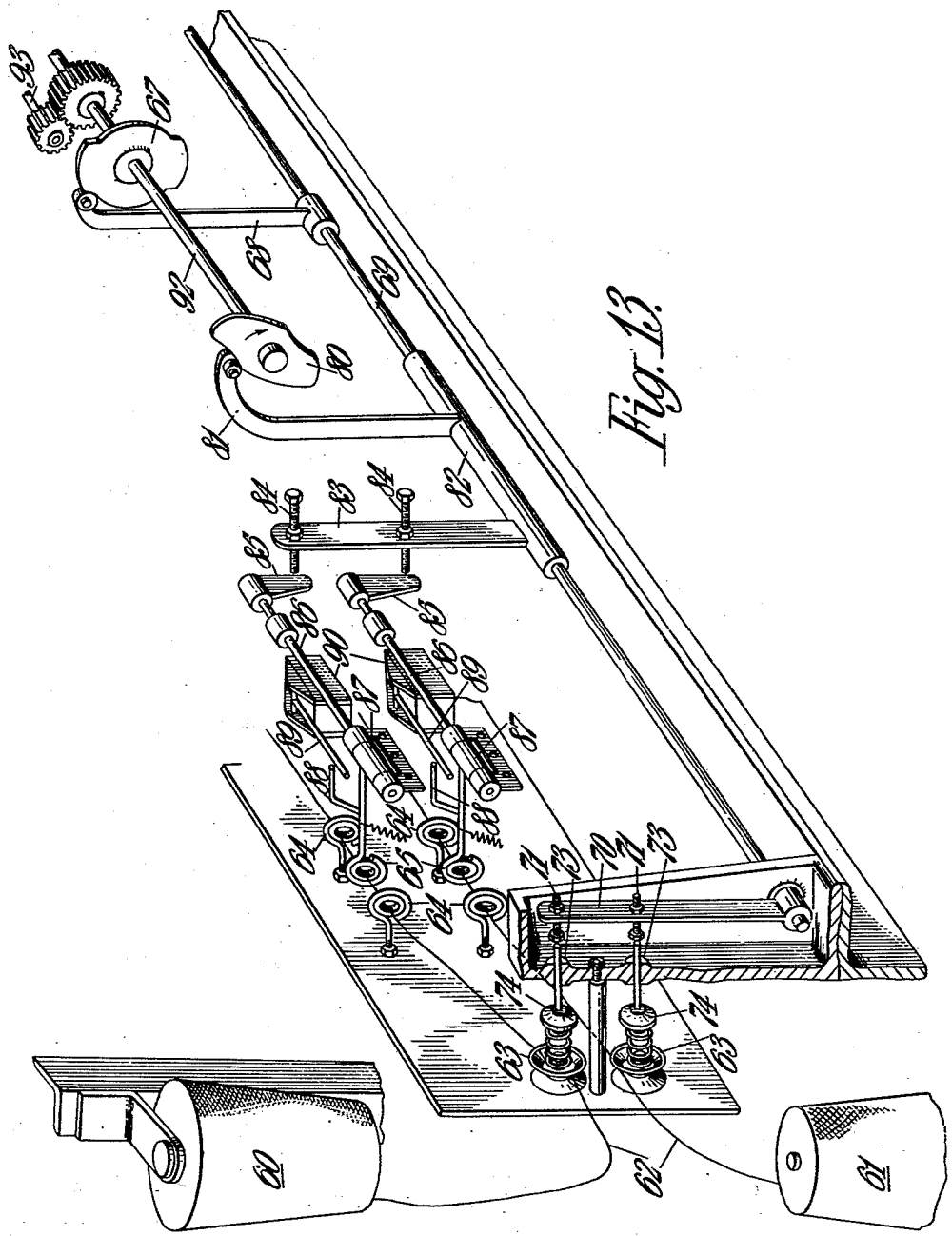
Inventor
D.W.Shimwell Dec. 17, 1957   D. W. SHIMWELL   2,816,576
LOOMS FOR WEAVING
Filed Aug. 2, 1954   17 Sheets-Sheet 8

Inventor
D. W. Shimwell

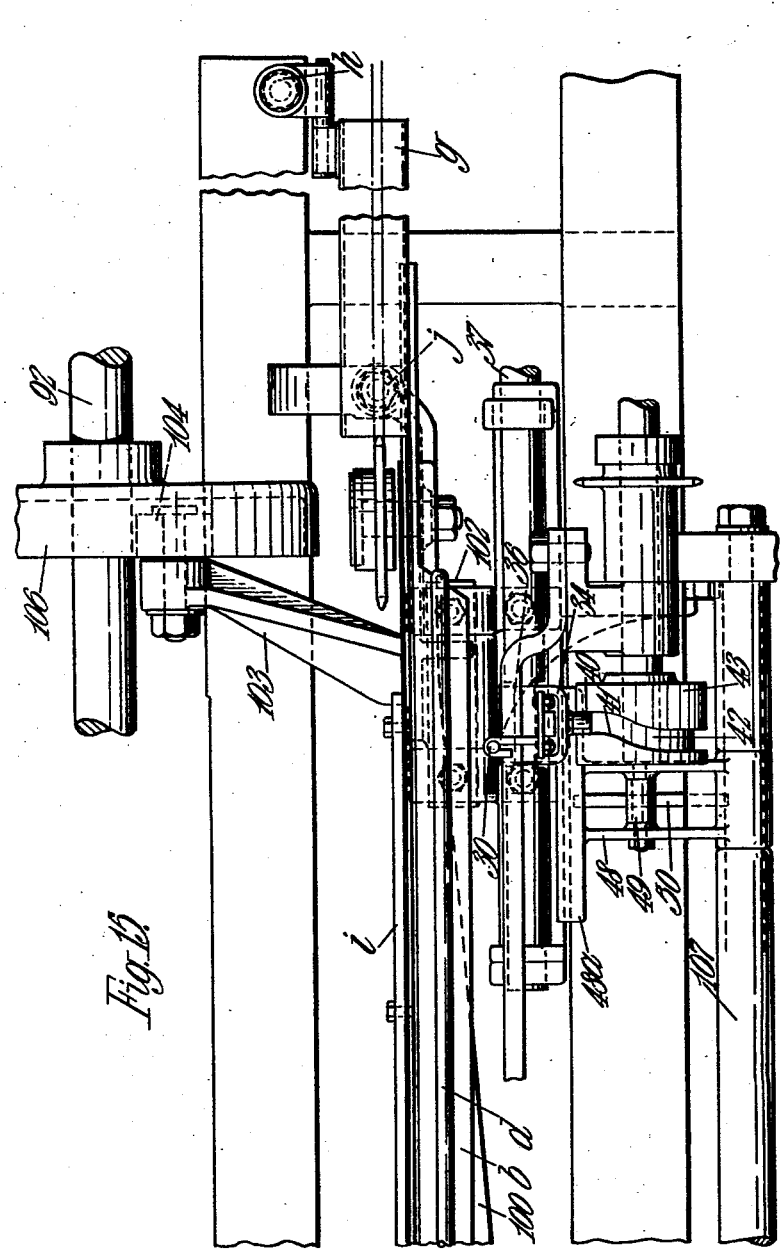

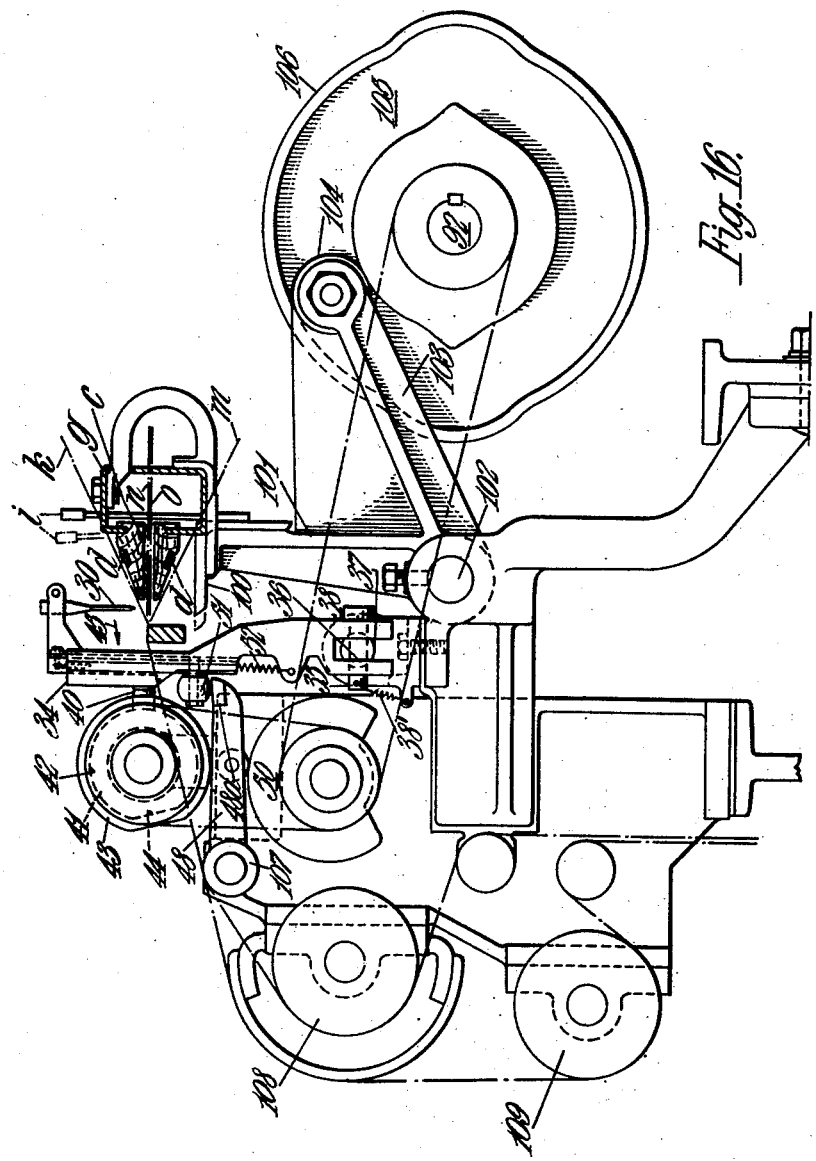

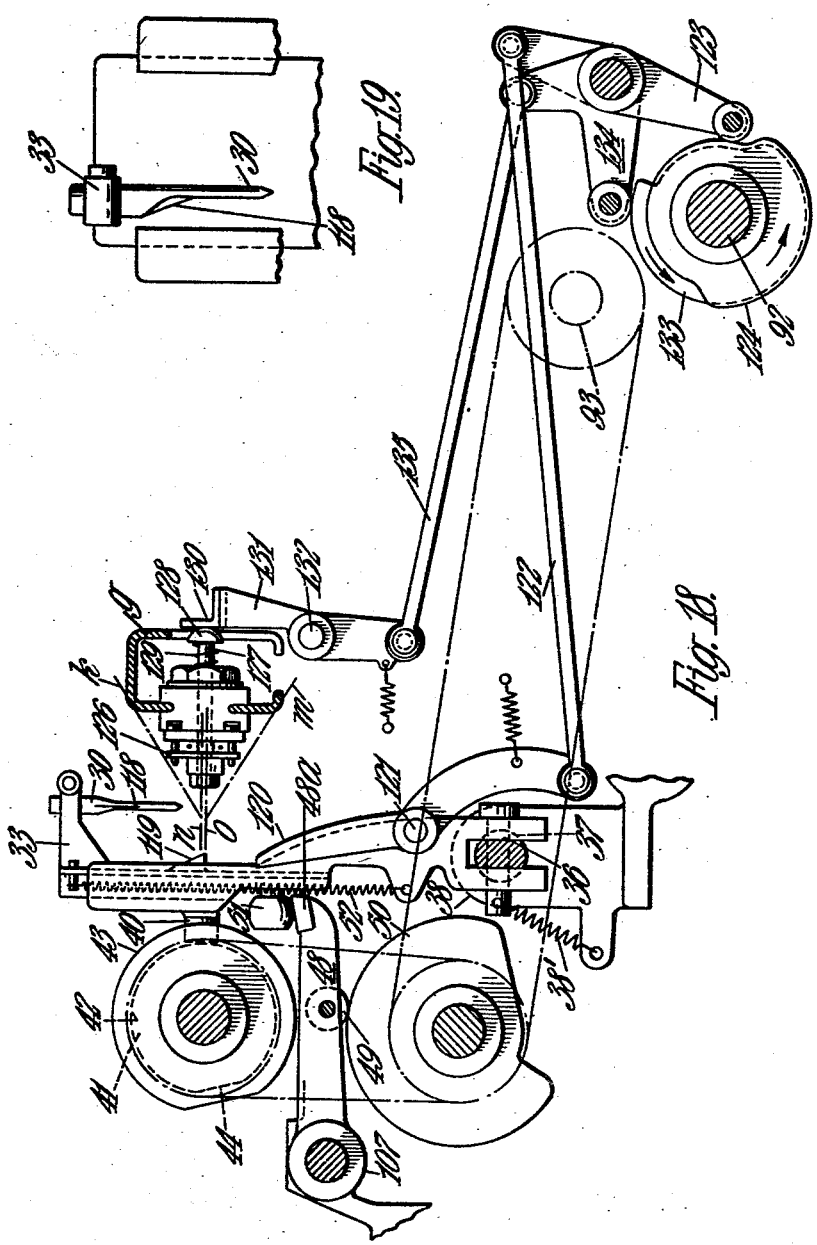

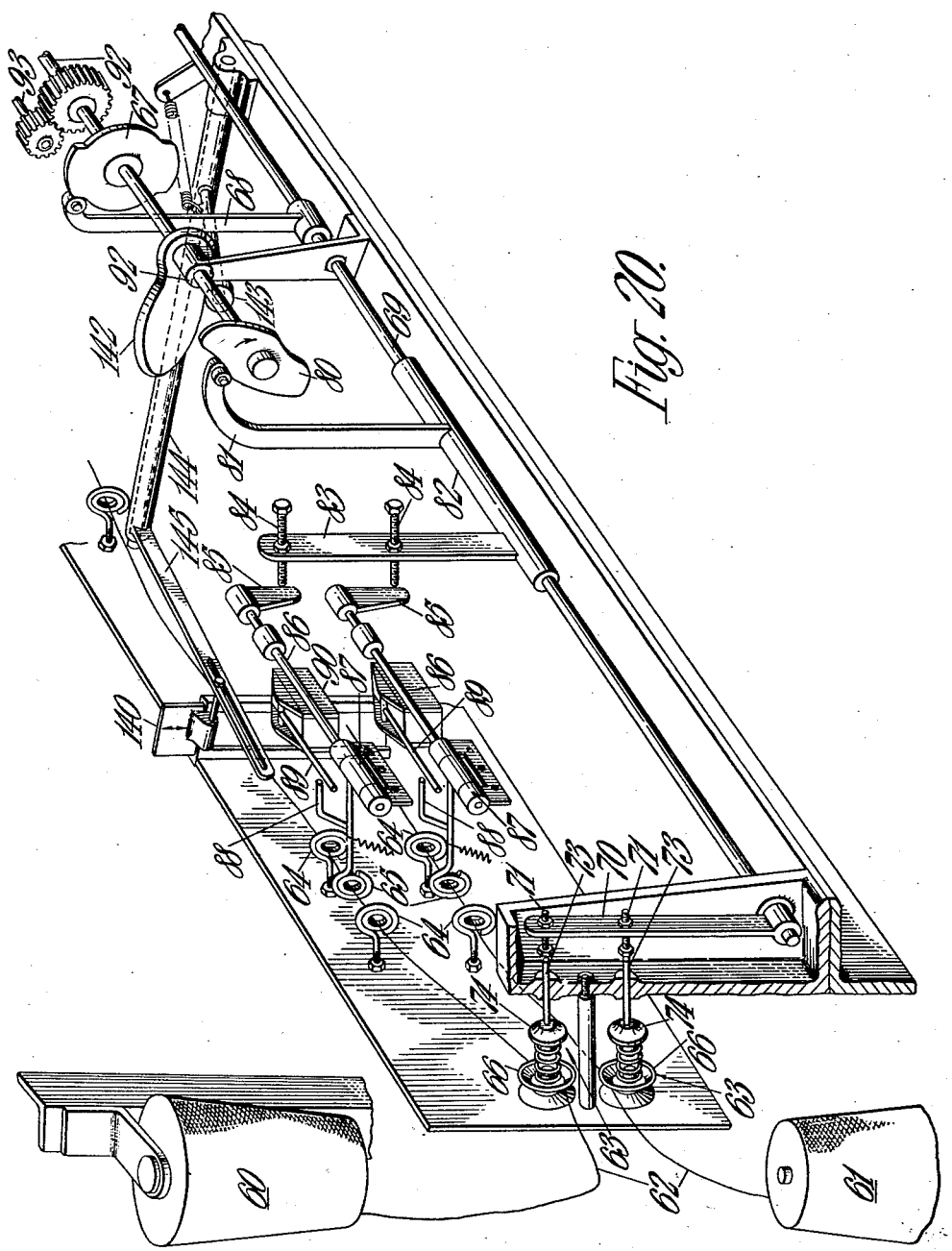

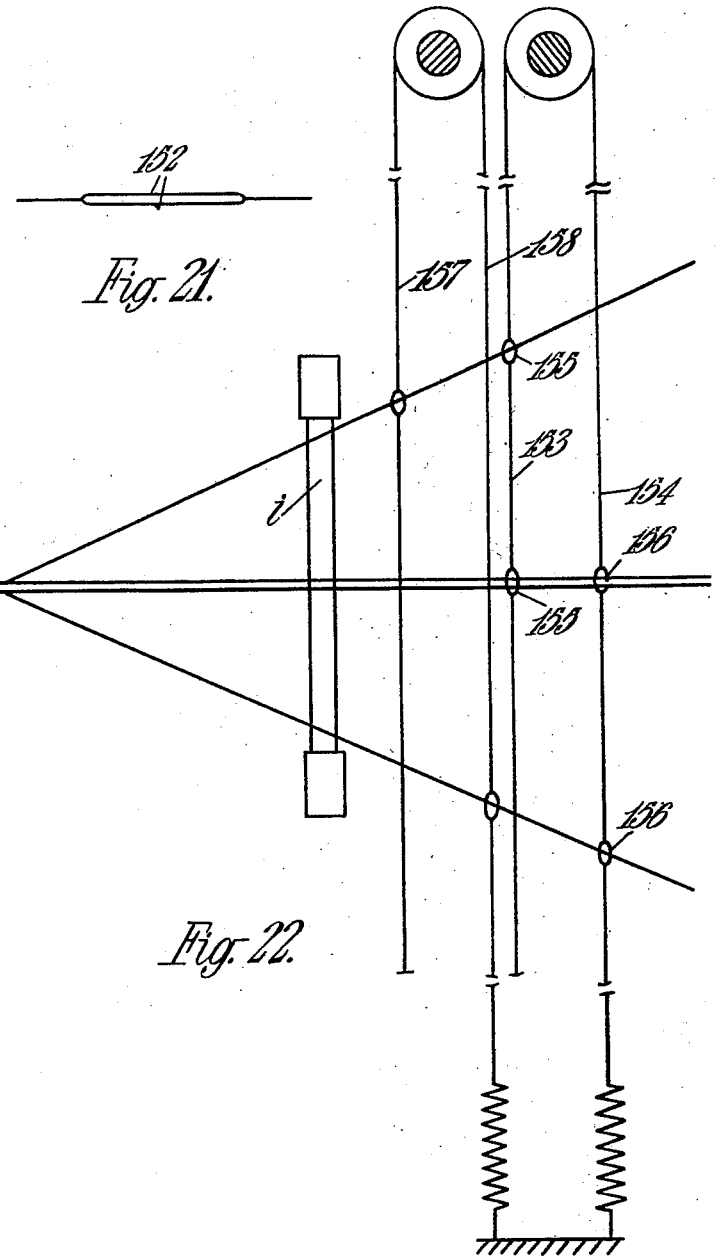

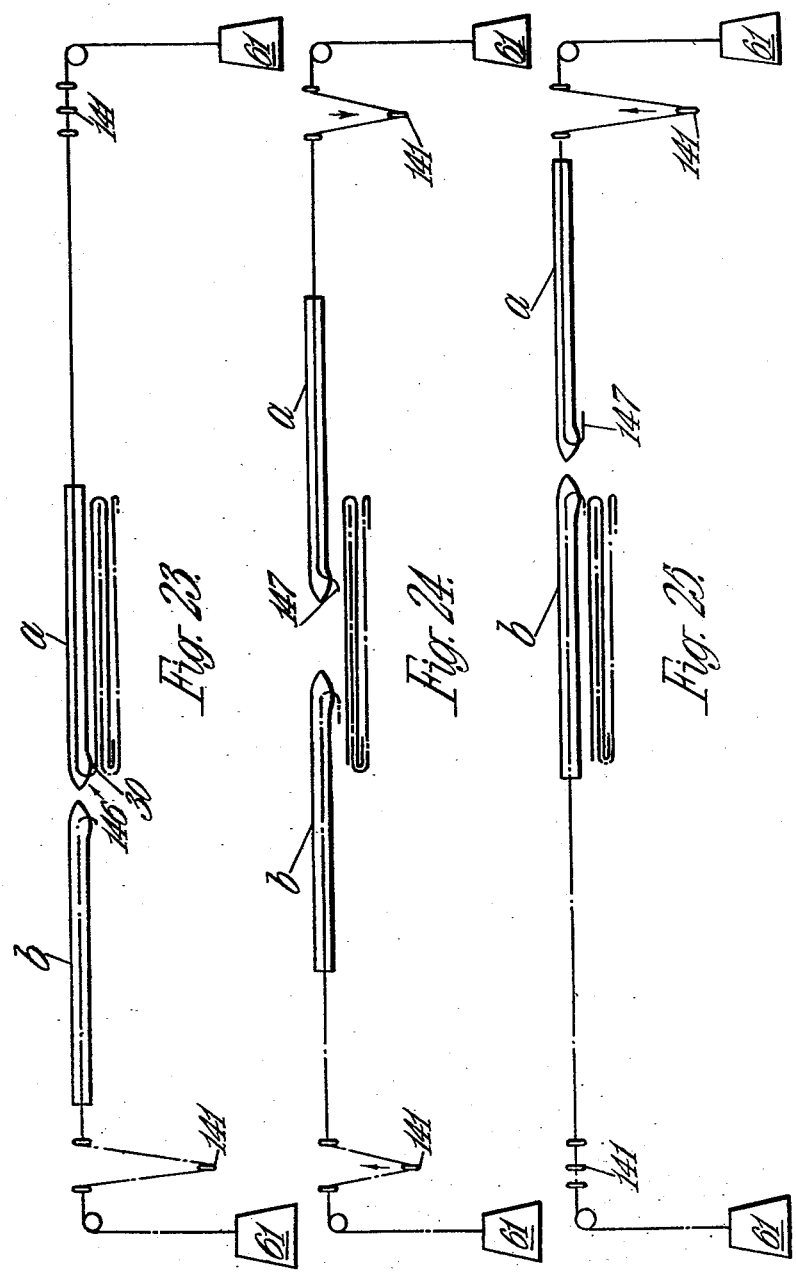

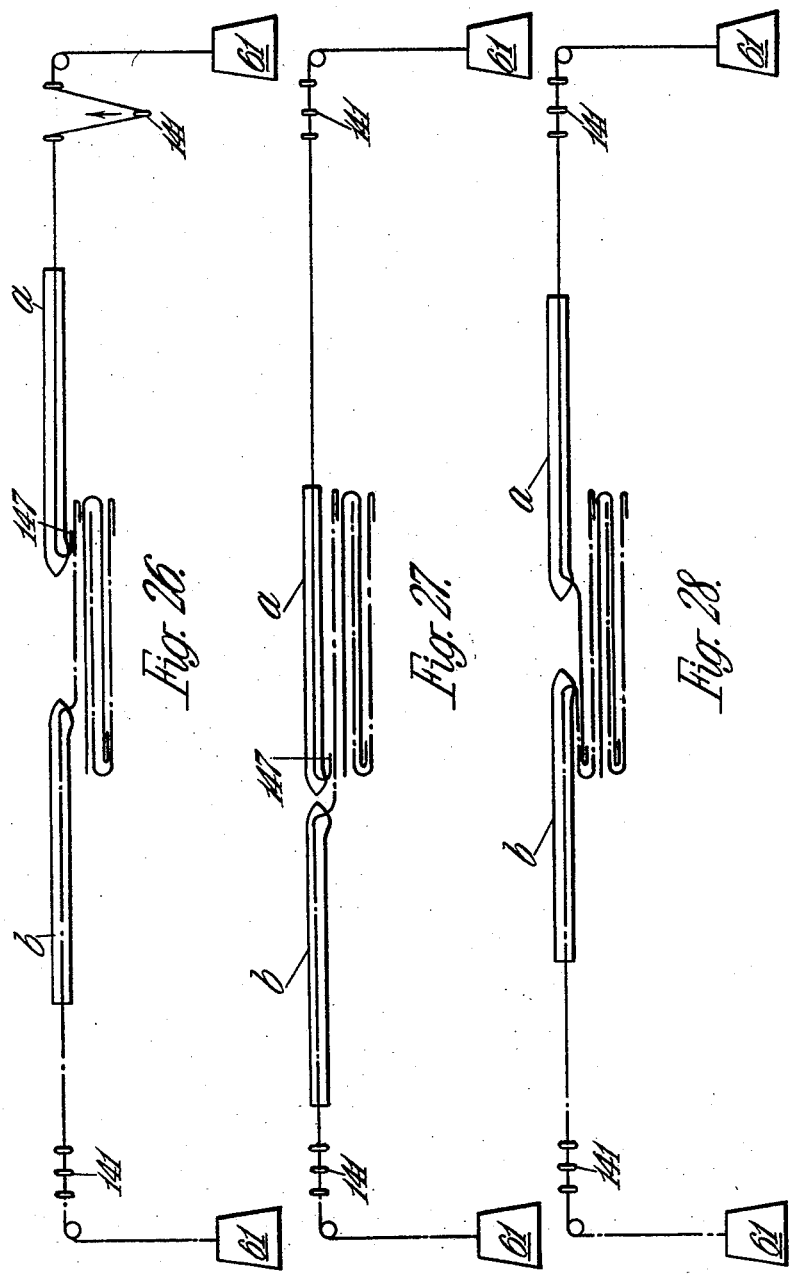

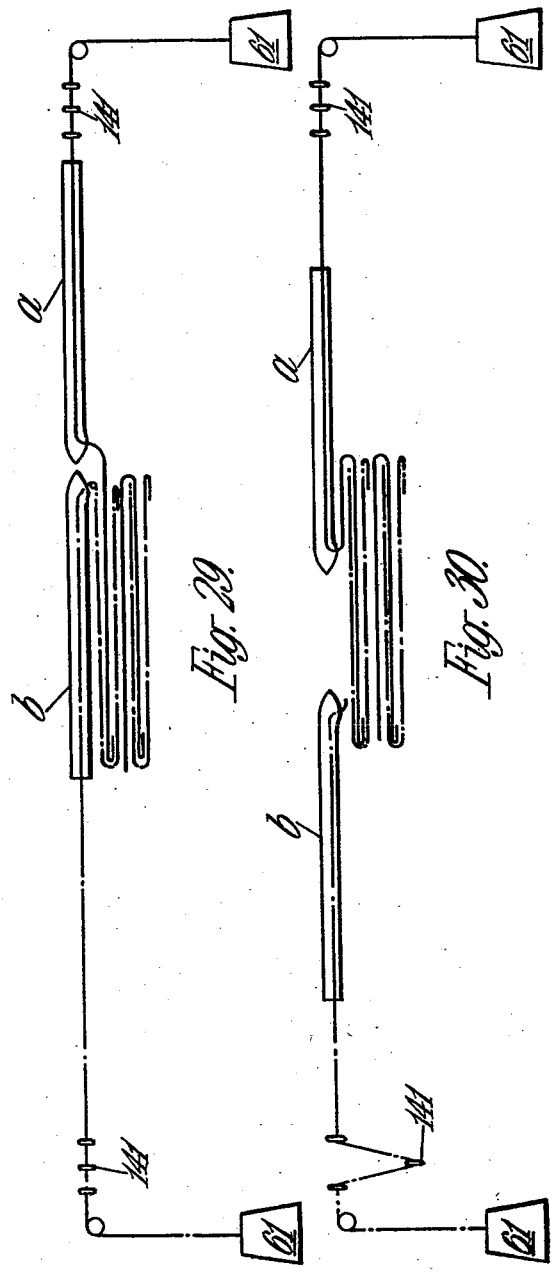

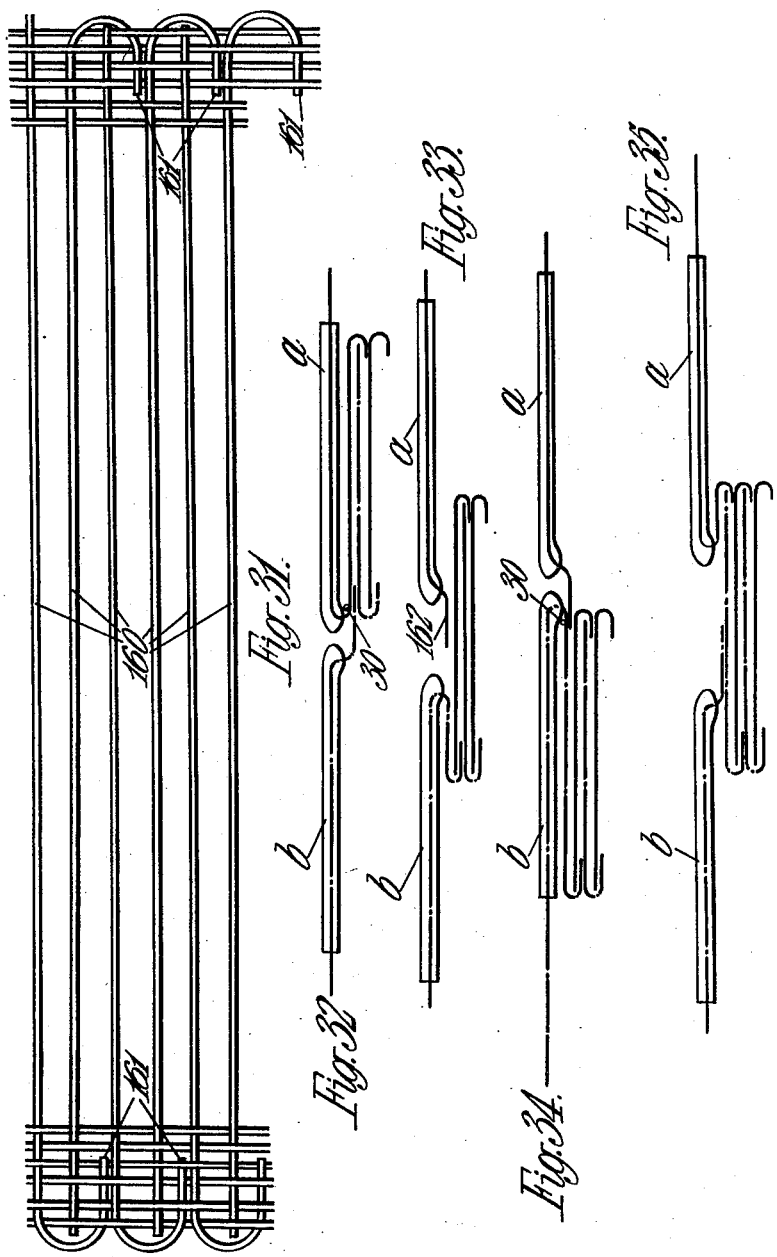

United States Patent Office 2,816,576
Patented Dec. 17, 1957

2,816,576

LOOMS FOR WEAVING

Derrick Walter Shimwell, Jurby, Isle of Man, assignor to Weaving Research & Textile Commission Agents Limited, Jurby, Isle of Man, a British company Application August 2, 1954, Serial No. 447,282

Claims priority, application Great Britain August 14, 1953

10 Claims. (Cl. 139—123)

This invention relates to looms for weaving.

The chief disadvantage of conventional designs of loom is their low rate of cloth production. For example, one weft pick is inserted into the warp shed from one side of the loom and when the weft inserting means have moved clear of the warp shed, a reed or similar device effects beat-up of said weft pick to secure it firmly in the fell of the cloth. After this, shedding or crossing over of the warps takes place preparatory to the insertion of another weft pick from the opposite side of the loom. It will be appreciated that with this conventional arrangement of loom, warp shedding or crossing over occurs only after the weft inserting means have passed a weft pick into the warp shed and moved clear of the shed. This is one important factor causing a low rate of production with a loom of conventional design. Another important factor is that the beating up of the last weft pick in the warp shed cannot be effected by the usual reed or like device until the weft inserting means have moved clear of the warp shed.

The chief object of my invention is to increase loom production by rendering it unnecessary for shedding or crossing over of the warp threads to be delayed until weft inserting means laying a weft pick in the warp shed have moved out of the warp shed. A further object of the invention is to speed up a loom still more by enabling beat-up to be effected without waiting until the weft inserting means which inserted the last weft pick in the warp shed have withdrawn from the warp shed.

Further objects of the invention and the results achieved will be apparent from the following description.

For convenience of references, the weft inserting means which are reciprocating members adapted to introduce weft picks into the warp shed and carry each pick across the width of the cloth, are hereinafter termed spears.

The invention consists in a weaving loom in which two weft yarns are carried into the warp shed from opposite sides thereof by two reciprocated spears which follow each other closely across the warp shed, and in which the warp yarns are shedded or crossed over progressively across the loom in the space between the said spears so that the two weft yarns are laid in different sheds. It will be seen that as the warp yarns are shedded or crossed over in the space which exists between the forward end of one spear and the rearward end of the other spear as the two spears pass simultaneously across the fabric, considerable saving in time results in comparison with a conventional loom where the weft inserting means have to be clear of the warp shed, before the warp threads can be shedded or crossed over.

The invention further comprises a loom as aforesaid in which means are provided for pressing each spear into the fell of the cloth when the spear extends across the cloth, so that the spear itself effects beat-up. It will be appreciated that with the improvement set forth in this paragraph, we obviate the time lost in conventional looms where the weft inserting means must be clear of the warp shed before beat-up can be effected. By the conjoint effect of the improved shedding and improved beat-up, we can further increase loom production compared with a conventional loom producing the same quality and width of cloth.

The invention further comprises a loom as aforesaid in which the loom healds have their staves divided longitudinally into interconnected sections, which are separately operated to cause shedding to proceed gradually across the loom in the space between the advancing and retreating weft inserting spears.

The invention further comprises a loom as aforesaid in which the two weft yarns are carried into the fabric from stationary yarn packages at opposite sides of the loom.

The invention further comprises a loom as aforesaid in which each spear has a passage therein for the travel of the weft thread in the spear.

The invention further comprises the formation of a protuberance at the outer end of each spear where it lays weft thread in a warp shed, such protuberance pressing the weft into the fell of the cloth as the weft is laid in the shed.

The invention further comprises a selvedge pin at each selvedge or side of the sheet of warps, each pin being inserted into a double weft pick of loop form, so that the weft is looped around the pin, which is withdrawn after the loop has been completed.

The invention further comprises selvedge pins as aforesaid, each of which is moved into the space behind the protuberance on a spear to engage the weft, is then moved with the weft thereon to clear the protuberance as the spear reverses its movement, is thereafter moved close to the selvedge and is raised to release the loop, the pin being then moved away from the selvedge for a next cycle of movements.

The invention further comprises a loom as aforesaid in which each selvedge pin incorporates a cutter which when the pin is lowered deep into a loop formed around the pin, severs the loop.

The invention further comprises a loom as aforesaid in which each of the two spears is operated by a chain or the like attached at an intermediate point to its spear and passing round wheels on a carriage, the chain ends being anchored, the two carriages being reciprocated by connecting rods extending in opposite directions from a common crank pin and being substantially in line when the spears are respectively fully in and fully out of the shed, and the connection from the crank pin to the carriage operating the spear that is fully in the shed (i. e. in the beat-up position) being between the axis of the crank shaft and the carriage, so that the spear moving from the beat-up position moves faster than the spear moving into the shed, which results in widening the distance between the spears in which shedding can take place.

The invention further comprises means which cause the movement of each spear to be momentarily arrested when the spear extends across the shed and beat-up is taking place.

The invention further comprises a loom as aforesaid adapted for the simultaneous weaving of two fabrics, the loom having separate upper and lower sheds of warp threads and each spear is of duplex construction to enable it to lay simultaneously two weft yarns, one in each shed, the duplicated parts of each spear being separated by a space through which pass the upper warps of the lower shed and the lower warps of the upper shed. By the aforesaid means we are enabled to double the output of woven fabric per loom, giving an increased output of certain cloths of up to 150% beyond that obtained with a conventional loom.

The invention further comprises the provision in a loom for producing simultaneously two fabrics, of an additional warp shed consisting of a few threads only, e. g. three to six, located at the opposite sides of the two sheds of warp threads which produce the two fabrics, which is shed in both fabrics so that the sides of the two fabrics are woven together by the warp threads of the additional warp shed to produce a tubular fabric.

Referring to the accompanying explanatory drawings:

Figure 1 is a front perspective view showing the center portion of a loom constructed in one convenient form in accordance with this invention.

Figure 2 is a detail view of one of the duplex weft spears shown in Figure 1.

Figure 2a is a cross-sectional view taken along the line A—A of Figure 2.

Figure 2b is a cross-sectional view taken along the line B—B of Figure 2.

Figure 3 is a view looking on the rear end of a weft spear showing the spear guide and the connection of the spear to the chain by which it is reciprocated.

Figure 4 shows one arrangement of the mechanism by which the spears are reciprocated.

Figures 5 and 6 are diagrams showing how one spear moves faster than the other after reversing at the end of a traverse.

Figure 7 is a diagrammatic view showing the drives to the mechanism for reciprocating the spears, and for operating the beat-up and shedding cam shafts and the weft clamps and weft detector mechanism.

Figure 8 shows a construction of sectional heald for the progressive shedding of the warp threads across the shed.

Figure 9 is an end view drawn to a larger scale of Figure 8 showing heald operating mechanism.

Figure 10 is one pattern of a fabric produced on the improved loom.

Figure 11 is a side view of selvedge pin operating mechanism and Figure 12 a rear view of such mechanism.

Figure 13 shows the weft tensioning, detecting and stop mechanisms, one of which is arranged at each side of the loom shown in Figure 1.

Figure 15 is a plan view of the beat-up mechanism at one side of the loom and Figure 16 is a side view of such mechanism.

Figure 18 is a view similar to Figure 11 but showing a selvedge pin which also acts to sever the loops around it.

Figure 19 is a detail view of the selvedge pin taken at right angles to Figure 18.

Figure 20 is a view similar to Figure 13 but showing a weft take-up device for use when the loom is adapted to leave single picks in the warps.

Figures 21 and 22 show a tubular fabric as produced in the improved loom and the arrangement of healds for producing same.

Figures 23–30 show the stages in the production of a fabric having a weft pattern as shown in Figure 17.

Figure 31 is a pattern of a further fabric which can be produced on the improved loom.

Figures 32–35 show the stages in producing the fabric illllustrated in Figure 31.

Figure 14:
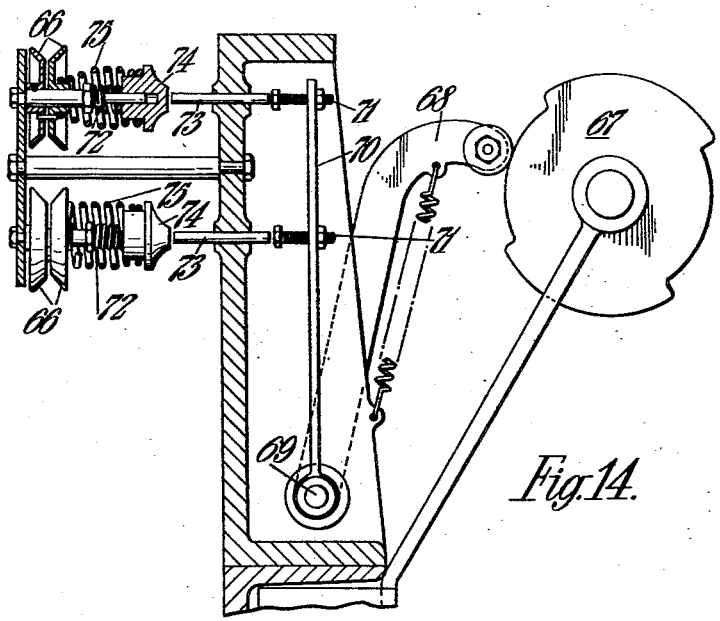
Figure 14 is a detail view of the means shown in Figure 13 for operating the weft grippers.

There are two spears $a$ and $b$ (see Figure 1) which are reciprocated into and out of the warp shed, one spear leaving the shed at one side thereof and the other leaving it at the other side thereof. Each spear when in its position fully across the shed is used for beating-up the weft as hereinafter described. The spear $a$ is shown approaching the beat-up position. It has to go a little further to the left to be fully in such position.

In the example illustrated, see especially Figure 2, each spear is of duplex construction for the simultaneous production of two fabrics, one above the other. It will be noted that there is a cap $c$ extending along each spear dividing it into upper and lower similar parts, each part having a tube $d$ incorporated therein through which the weft thread indicated at $e$ passes to the outer end of the spear where there is a protuberance $f$ which, as the spear moves through the shed in a forward direction, presses the weft pick which it is laying in the warps into the fell of the fabric already woven.

The weft supplies may be obtained from stationary weft packages; or such packages may be carried on the spears. As shown in Figure 13 the weft supplies are obtained from stationary weft packages at each side of the loom. This will be described later in conjunction with the weft tensioning and detector mechanism.

Each spear reciprocates in a guide $g$ (Figure 1) capable during beat-up of a limited amount of movement about a support $h$ towards the outer end of the guide, in order to allow the spear to move along with the reed $i$ and sley to effect beat-up. Each guide is pivoted to the sley at $j$ at its forward end. The beat-up mechanism will be described in detail later.

There are of course two warp sheds operating in conjunction with the two duplex spears, the upper warp $k$ of one shed passing over the upper part of a spear, the lower warp $m$ of the other shed passing across the lower part of a spear, and the lower warp $n$ of the upper shed and the upper warp $o$ of the lower shed passing through the gap $c$ between the upper and lower parts of the duplex spear. The two fabrics produced come together as they are drawn off by tension rollers, after which they are delivered to separate batch rollers. If the two fabrics are interconnected at their selvedges by warp threads as hereinafter described to produce a tubular fabric, then there will be only one batch roller.

Means for reciprocating the two duplex spears $a$ and $b$ are shown in Figures 4, 5, 6 and 7 and ensure that the two spears follow one another relatively closely whilst one passes into and the other passes out of the shed, a space between the trailing end of one spear and the leading end of the other spear being left, so that shedding can take place progressively across the warp shed in such space; thus the advancing rear spear will move in a different shed from the retreating forward spear which is gradually passing out of the shed. This distance between the spears as they move across the shed can be constant or it may be a maximum at a midpoint of the width of the shed and lessen towards each side thereof.

In the construction of spear traversing mechanism now to be described, the space between the spears $a$ and $b$ as they pass respectively out of and into the shed, is a maximum at about a midpoint in the width of the shed. As the mechanisms for the two spears are substantially the same, like references will be given for most similar parts of the two mechanisms.

The two spears $a$ and $b$ are traversed by two chains $q$, a link $r$ of each of which is secured to a spear by bolts as $s$ (Figure 3) passing through the spear. The anchor points of the chains to the spears are indicated at $t$ in Figures 2 and 4. The two ends $u$ and $v$ of each chain are anchored to a member $w$ which is normally stationary but which can, as hereinafter described, be moved to produce a slight dwell in the traverse of the spears at beat-up. The chain $q$ passes around chain wheels $x$ on a carriage $y$ reciprocating in guiding rails $z$. There is a crank 2 on a shaft 3 driven at loom speed and this crank through connecting rods 4 and 5 reciprocates the carriages $y$ and so causes the chains $q$ to reciprocate the spears (see also Figure 6).

When the connecting rods 4, 5 are in line as shown in Figure 5, the two spears $a$ and $b$ are at the ends of a traverse and their adjacent ends are close together. As however, the crank 2 turns about its axis, the spear $a$ (Figure 4) which is moving out of the warp shed, travels faster than the spear $b$ moving into the shed and so a gap is produced between the trailing end of the leading spear $a$ and the forward end of the rear spear $b$. In Figure 6, the crank 2 is shown in a mid-position between that shown in Figure 5 where the connecting rods are in line and a position in which the crank 2 is in the Figure 4 position at right angles to the Figure 5 position. It will be seen from Figure 6 that the outer end of the connecting rod 4 has travelled further from its extreme position than the outer end of the connecting rod 5, and this will cause the spear $a$ (which in this case is the forward spear) to be further from the spear $b$ (which is now the rear spear), than it was when the connecting rods 4 and 5 were in the Figure 5 position. There will thus be produced a gap or space between the spears $a$ and $b$ which will be a maximum when the crank 2 is at or about a position (shown in Figure 4) at right angles to its position when the connecting rods 4 and 5 are in line. This space or gap between the spears will lessen as the connecting rods 4 and 5 again approach a position in line with one another, that is when one spear is out of the warp shed and the other is fully across such shed.

Upon the shaft 3 is a disc 6 with which the crank 2 is integral, and in such disc is an internal cam groove 7 engaged by rollers 8, 9 (Figure 4) on levers 10, 11 pivoted at 12, 13 and pivotally connected to the members $w$ to which the ends of the two chains $q$ are anchored. The cam groove 7 serves to give a momentary outward movement to each lever 10, 11 and so to the members $w$ and the anchor points of the chains during each loom cycle at the ends of the traverse of the spears, and this results in a momentary stoppage of the movements of the spears. Such stoppage in the case of the spear which is fully in the shed in the beat-up position enables beat-up to be effected whilst the spear is stationary.

As already stated, the space between the spears $a$ and $b$ as they move respectively out of and into the shed may be produced by reciprocatory means which maintain such space of constant length, which will necessitate a slight increase in the width of the loom, as the spear moving out of the shed will have to go further out of the shed than with the above described arrangement. Also it may not be necessary to provide for an actual dwell in the movement of the spear which is in the beat-up position, beyond that produced at reversal of movement of the spear. The speed of the spear will be slowed down at reversals as in the present construction.

Reference has been made to the shedding of the warps progressively as the two duplex spears move simultaneously out of and into the warp shed, the shedding being effected so that the rear spear moves through a different shed from the forward spear. This is effected as shown in Figures 8 and 9, by dividing the top and bottom heald staves into sections 15, 16, 17 and 18 pivoting them together at 19 and operating the ends of the top and bottom sections of the staves successively by separate cams. Thus cams as 20 Figure 9 on the shaft 93 of Figure 7 which rotates at loom speed act on rollers 22 on levers 23 which draw the stave sections downwards, the said sections being returned (when allowed by the cams 20) by the spring loaded levers 25. It will be appreciated that there are two healds and that each heald deals with a row of warps in each of the two warp sheds. Figure 9 shows the cams operating heald sections of two healds, one behind the other, controlling the two warp sheds, one section of one heald being raised whilst the corresponding section of the other heald is lowered. Each heald may have its staves divided into any number of sections, to suit requirements.

Figure 10 is a diagram showing a pattern of one fabric which can be woven on the improved loom, the pattern serving to indicate the function of selvedge pins 30, shown diagrammatically in Figure 1, at each side of the sheet of warp threads which help to form the weft loops at the selvedges. Each spear carries a loop of weft thread into the warp shed, each time it passes into such shed, and it leaves such loop in the shed as it passes out of it, so that a continuous series of loops is passed into the shed from opposite sides, the loops overlapping at the selvedges as shown diagrammatically in Figure 10. The plain looped weft picks 31 are laid by one spear and the cross hatched looped weft picks 32 are laid by the other spear. The selvedge pins 30 are inserted into the weft loops as each spear completes its traverse in one direction and commences to return.

Figures 11 and 12 are detail views of a selvedge pin 30 and of the means for operating the same. Each pin 30 is carried on a slide 33 in a member 34 which can turn about a fulcrum pin 35. The lower end of the member 34 is bifurcated as shown and straddles the flattened part 36 of a spindle 37 which can turn freely in bearings at 38. The fulcrum pin 35 passes through the part 36 of the spindle 37 and a spring 38 acting on the pin 36 tends to turn the member 34 about the axis of the spindle 37 and so press a projecting cam follower 40 on the member 34 against a cam 41 at the base of a cam groove 42 in a revolving member 43. Said cam 41 has a flat at 44 so that when the member 40 comes against said flat, the spring 38 moves the member 34 and the selvedge pin 30 in the direction of the arrow 45. When the cam follower 40 passes off the flat 44, the pin 30 is returned to the position shown. The follower 40 also engages the side walls of the cam groove 42 which imparts a pivotal movement to the member 34 about the axis of the pin 35. Thus the member 34 has pivotal movements in two directions at right angles to one another. The slide 33 is raised in the member 34 by an arm 48 (having a roller 49 thereon which rides on a cam 50) which has a long pallet 48$^a$ to engage the part 51 on the member 34. The slide is lowered, when allowed by the cam 50, by springs 52. The cams 50 and 43 are driven from a common drive chain 53 and an interconnecting chain 54.

The action of the selvedge pin mechanism is as follows: As a spear $a$ or $b$ carries its weft to the opposite or far side of the warp shed to that from which its weft supply is drawn, the pin 30 at such far side is moved by the cam groove 42 in the member 43 away from the sheet of warps and is then lowered by the springs 52 (as allowed by the cam 58 and arm 48) into an area behind the protuberance $f$ (see Figure 2) on the spear, and weft is looped round the pin 30 as the spear moves backwards after completing its traverse through the shed. The pin is now moved with the weft thereon (due to the follower 40 moving on to the flat cam surface 44 under the pressure of the spring 38) away from or at right angles to the spear so as to clear the protuberance $f$ on the spear as the latter returns, after which the springs 38 (as allowed by the cam 41) return the selvedge pin 30 to its normal position beyond the spear, and the cam groove 42 in the member 43 moves the pin close into the cloth selvedge. The selvedge pin is thereafter raised by the cam 50, arm 48 and part 51 on the member 34 and leaves a neat loop in the selvedge, the weft tensioning means to be hereinafter referred to drawing the loop up into the selvedge.

The weft yarn passing to the respective spears is passed through guides, tensioning means and stops and Figure 13 illustrates a weft control mechanism which is arranged at opposite sides of the loom beyond the ends of the spears when they are fully out of the warp shed.

The yarn packages 60 and 61, Figure 13, which supply weft to the two parts of a duplex spear operating from one side of the warp shed are stationary and the yarn 62 therefrom passes through similar weft grippers 63, guide eyes 64, and weft detectors 65. It will be appreciated that as a spear $a$ or $b$ draws loops of weft thread through the warp shed to produce the pattern of fabric shown in Figure 10, the weft is taken from the yarn packages 60, 61. When each spear returns through the shed after laying a loop of weft in the shed and after a selvedge pin 30 has entered the loop at the far selvedge, it is important that there shall be no tendency for weft yarn to be drawn off the yarn packages when the yarn is being tensioned. When therefore a spear $a$ or $b$ has laid a loop of weft yarn in the warp shed, a weft gripper 63 (which comprises two non-rotating conical discs 66) as shown in detail in Figure 14, is caused to close on the weft by the action of a cam 67 which engages an arm 68 on a spindle 69 which has an arm 70 secured thereon with two adjustable stops 71 therein, one stop to close each of the two weft grippers at one side of the loom. The cones 66 of each weft gripper through which the weft passes, are normally held apart by a spring 72 and are brought together to grip the weft between them, when the stops 71 are pressed against the pins 73 which abut against heads 74 which bear upon springs 75 loading the discs 66 and pressing them tightly upon the weft between them. Immediately the spear has completed its traverse out of the shed and has left its weft loop therein, the weft gripper discs 66 are allowed by the cam 67 to open to enable the spear to draw weft from the package 60 or 61 and take a further weft loop into the shed. Thus a spear takes weft freely into the shed, a selvedge pin 30 passes into the loop at the far selvedge and the spear returns leaving a loop-form weft pick in the shed.

The detectors and weft tensioners 65 are raised by the action of a cam 80 acting on an arm 81 which turns a sleeve 82 having an arm 83 thereon with two adjustable stops or abutments 84 screwed therein. Each stop 84 is adapted to turn an arm 85 on a spindle 86 having thereon a boss 87, on which the detector 65 is secured. Each detector is held in the position shown by the cam 80. When a weft gripper 63 is holding a weft thread against movement, the cam 80 allows the detector 65 acting on such thread to fall in order to tension the weft and tighten the loop therein. If there should be a failure of weft, the detector will fall freely and an arm 88 on the detector will engage an arm 89 of a micro electric switch 90 and this by appropriate means will cause the motor driving the loom to stop. The weft yarn has then to be pieced up or the weft supply replenished, if a yarn package has become exhausted, before the loom can be restarted. The shaft 92 having the cams 67 and 80 thereon is driven from the shaft 93 (Figure 7).

Figures 15 and 16 illustrate more particularly the loom beat-up mechanism. The loom slay 100 to which the reed $i$ is secured, is pivotally connected at its opposite ends to the two spear guides $g$, the pivotal connection of one guide being shown at $j$. Each end of the slay is secured to one arm 101 of a bell crank lever pivoted at 102, the other arm 103 of the lever having a roller 104 at its end which comes into an internal cam groove 105 in a revolving disc 106. There are of course two levers as 101, 103 and two cams 105 to effect beat-up. The normal position of the reed $i$ with relation to a spear is shown in full lines in Figure 16. The dotted line position of the reed $i$ in that figure is the beat-up position when the cam grooves 105 have caused the bell crank levers 101, 103 to move the slay 100 forward to drive the spear which is fully across the warp shed into the fell of the cloth to effect beat-up.

The two fabrics which are woven simultaneously in the loom pass over a common roller 107 and are then separated and drawn off by tension rollers 108, 109, being finally led to separate batch rollers (not shown).

Figure 17:
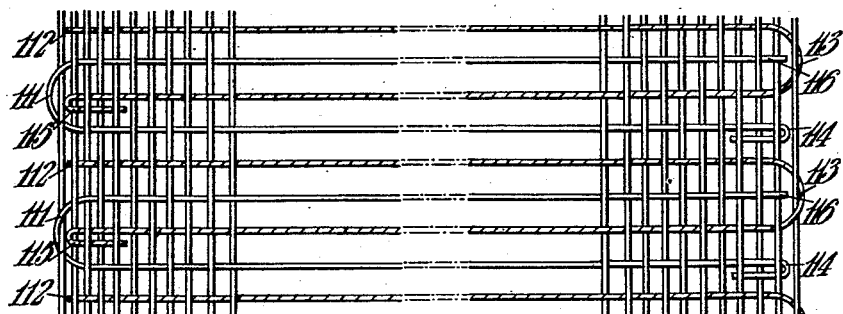
Figure 17 shows a further pattern of a fabric which can be produced in the improved loom.

Figure 17 shows a pattern of a fabric in which at one selvedge of the fabric weft loops 111 alternate with cut lengths 112 of weft and at the other selvedge weft loops 113 alternate with cut lengths of weft having a turned over end 114 in the selvedge. At the first mentioned selvedge, the cut lengths of weft with turned over end 115 come within the loops 111, whilst at the other selvedge, plain cut lengths 116 of weft come within the weft loops 113.

To cut the weft loops each selvedge pin 30 (see Figures 18 and 19) is formed with a cutter blade 118 in its shank. If the pin 30 is lowered into weft picks to a limited extent, loops form around the pin in the two fabrics being produced, but if the pin is lowered to a greater extent, the blade 118 cuts the two loops around the pin. The selvedge pins for the normal formation of loops therearound are operated in the manner described with reference to Figures 11 and 12. When cutters are incorporated in the pins, then as shown in Figure 18, there is a projecting lug or step 119 on the slide 33 carrying the pin 30 and when the cam 50 allows the spring to lower the slide 33, such lug or step 119 thereon engages and is supported by a lever 120 pivoted at 121 and operated through a connecting rod 122 and lever 123 by a cam 124. When loops around the pin 30 are to be cut, the cam 124 moves to cause the lever 123 and connecting rod 122 to withdraw the lever 120 from beneath the lug or step 119, so that the needle moves downwards sharply under the pull of the springs 52 and cuts the loops. The action of the cam 50 is to restore the slide 33 to its upper position, when the lever 120 goes back to the position shown in Figure 18 ready to intercept the next downward movement of the slide 33.

The shaft 93 which drives the cams 50 and 43 rotates at loom speed but the shaft 92 which operates the lever 120 turns at half speed, so that the lever 120 allows the needle 30 to drop to the low position necessary for its cutter 118 to sever the loop each alternate time that the cam 50 allows the needle to lower and form a loop. This is to produce the Figure 17 pattern.

It will be appreciated that if a selvedge pin 30 with cutter blade 118 cuts loops around the pin, the weft spear $a$ or $b$ must then move the weft threads extending through the tubes $d$ therein (see Figure 2) along with it as the spear withdraws from the selvedge at which the loops were cut. To effect this, each spear has thereon towards its outer end, which does not go into the warp shed, a weft clamp which is normally closed by a spring but is opened by cam operated mechanism when weft has to be drawn through the spear. In Figures 2 and 18, the weft clamp plate is shown at 126. It is loaded by a plunger 127 which has a head 128 thereon bearing upon the clamp plate 126 under the pressure of a spring 129. At the position in the movement of the spear at which the clamp plate 126 is to release the weft threads on the spear, the plunger 127 engages a bar or the like 130 carried by a lever 131 pivoted at 132 and operated from a cam 133 by a bell crank lever 134 and connecting rod 135. The shaft 92 having the cams 124 and 133 thereon is driven by the shaft 93 shown in Figure 7.

It will be further appreciated that when a spear $a$ or $b$ carries weft with it on its return stroke after carrying such weft with it into the warp shed on its forward stroke, take-up means will have to be provided operating on the weft supplies from the stationary weft packages.

If reference be made to Figure 20, it will be seen that in addition to the weft grippers, guides and detectors shown in Figure 13 and described with relation to a loom producing looped weft picks as shown in Figure 10, there is provided a cam operated rising and falling member 140 having guide eyes 141 therein through which the weft yarn passes on its way to a spear for producing a cloth as in Figure 17. A cam 142 on the shaft 92 (carrying the cam 67 to control the weft grippers and the cam 80 to control the weft detectors and tensioners 65) engages an arm 143 and turns a hollow spindle 144 having an arm 145 thereon which raises and lowers the member 140 so letting-out and taking-up weft respectively.

Where it is desired to produce a tubular fabric by uniting at their edges the two fabrics produced by the loom hereinbefore described, we provide two separate sets of warp threads, each set consisting of a few (e. g. three to six) threads, located at the opposite sides of the normal warp threads which produce the two fabrics, and such separate warp threads are shedded over both sets of weft threads, so that the sides of the two fabrics are woven together to produce a single fabric at the opposite edges of the two fabrics.

Figure 21 shows on a small scale a tubular fabric made of two fabrics 152 produced with their own weft threads and warp sheds but with the ends of the two sets of weft threads bound together by a set of warp threads at each opposite side of the two fabrics.

Figure 22 shows diagrammatically the warp shedding arrangments. Two sets of healds 153 and 154 each have two eyelets in each heald (the eyelets in one heald being numbered 155 and in the other 156), so that the upper and lower warps of two sheds are shedded simultaneously. This produces, with the weft threads from two duplex spears *a* and *b*, two fabrics woven very closely to one another. The other pair of healds 157 and 158 shed only one set of warp threads but these operate for the end portions of all the weft threads which go into the two fabrics. Thus such end portions are woven into one fabric.

Figures 23-30 show stages in the production of a fabric where looped picks are severed by the cutter type selvedge pins. In Figure 23, the spear *a* has just laid a loop of weft in the warp shed and a selvedge pin has entered at 146 and is about to cut the weft at a short distance from the spear so that as shown in Figure 24 there is an end 147 trailing from the spear. The weft gripper on the spear *a* is closed and the weft take-up device 141 is taking up the loose weft as the spear retreats. The trailing end 147 is carried out of the shed as shown in Figure 25 and then the spear *a* advances carrying weft into the shed and having the trailing end 147 dangling from it. As the spear *a* arrives at the far selvedge, the trailing end 147 is still in the warps and is laid in the fell of the cloth, the pin 30 dropping into the loop and thus holding such end 147. This is the position shown in Figure 27. The spear *a* retreats as shown in Figure 28, leaves the weft in the shed as shown in Figure 29, and returns as shown in Figure 30 to form a loop at the selvedge. The next position of spear *a* is that shown in Figure 23. Thus the weft from spear *a* has its weft loop cut in the Figure 23 position and then the spear travels backwards idly, advances to near the end of its forward stroke before it leaves the trailing end laid in the selvedge, retreats laying one leg of a loop in the shed and then advances laying the other leg of the loop in the shed. At the end of such advancing movement, the weft is cut, leaving a length trailing from the spear. The same thing happens with the weft traversed by the spear *b*, the selvedge pin severing such weft at the end of each four traverses and entering the looped weft without cutting it at the end of three traverses from the cutting operation. Each spear forms loops in one selvedge only. The cycles of the two spears are the same but one spear is one stage of its complete cycle in advance of the other spear.

The pattern of fabric shown in Figure 31 has weft picks of walking stick form, that is a straight length 160 across the fabric and a turned over end 161 laid in the selvedge, the ends of the straight lengths of one set of weft picks coming within the turned over or looped portions of the other set of weft picks.

As shown in Figure 32, the spear *a* has just laid a straight length of a weft pick in the fabric and the pin 30 is about to be depressed to sever the loop at a short distance from the spear when it completes its stroke. The spear *a* will then return carrying the loose end 162 of weft yarn trailing behind it, see Figure 33. The spear *b* has left its trailing end 163 of weft yarn in the fabric and is laying the straight length of its weft pick in the warp shed. In Figure 34, the spear *b* has completed the laying of its straight length of weft pick and the pin 30 is about to sever the weft thread. The spear *a* has left the trailing end 162 of its weft in the selvedge and is about to return carrying the straight length of its weft pick into the warp shed. Figure 35 shows the two spears returning to the Figure 32 position, where they complete a cycle of operations.

What I claim is:

1. A weaving loom comprising two spaced reciprocated spears, each for carrying a weft yarn into the warp shed from opposite sides of the shed, with one spear travelling behind the other spear across the warp shed and wherein the warp threads are shedded progressively across the loom in the space between the spears as the spears pass through the warp threads whereby two weft yarns can be laid in different sheds, means at each selvedge for automatically severing loops of weft laid in the warp shed by the spears, and grippers on the spears whereby the spears can carry severed ends of loops through the warp shed.

2. A weaving loom as claimed in claim 1 wherein the two spears move in the shed in the same path and means press the spears into the fell of the cloth.

3. A weaving loom as claimed in claim 2 wherein the pressing means is a reed.

4. A weaving loom as claimed in claim 1 wherein each spear is provided with a tubular passage for the travel of the weft thread.

5. A weaving loom as claimed in claim 1 wherein means is provided to open each gripper on a spear when the spear is passing through the shed but leaving its weft in the shed.

6. A weaving loom as claimed in claim 1 for the simultaneous weaving of two fabrics and having separate upper and lower sheds of warp threads, each spear being of duplex construction and having a common end portion by which it is operated whereby the spear can lay simultaneously two weft yarns, one in each shed and the duplicated parts of each spear being separated by a space through which space pass the upper warps of the lower shed and the lower warps of the upper shed.

7. A weaving loom as defined in claim 6 wherein pins and cutters are provided at the selvedges to form loops and cut the loops and define straight weft at the selvedges, one pin and its associated cutter operating in the two fabrics being woven simultaneously.

8. A weaving loom as defined in claim 1 wherein means reciprocate each spear which serves to narrow the space between the two spears at the selvedges.

9. A weaving loom as defined in claim 1 wherein a chain is attached at an intermediate point to each spear, a wheeled carriage for each spear with each chain passing about wheels on the carriage, means anchoring the chains, with the chains operating the spears, a common crank pin, connecting rods extending in opposite directions from the crank pin operatively connected to the carriages for reciprocating the carriages and being substantially in line when the spears are respectively fully in and fully out of the shed, and the connecting rod operating the spear that is fully in the shed being between the axis of the crank shaft and the carriage whereby the spear moving from the fully in position moves faster than the spear moving into the shed resulting in widening the distance between the spears in which shedding can take place.

10. A weaving loom as claimed in claim 6 wherein an additional warp shed including only a few threads is located at the opposite sides of the two sheds of warp threads producing the two fabrics and the additional warp sheds being shedded in both fabrics whereby the sides of the two fabrics are woven together by the warp threads of the additional sheds to produce a tubular fabric.

References Cited in the file of this patent
UNITED STATES PATENTS

| | | |
|---|---|---|
| 988,589 | Nauen | Apr. 4, 1911 |
| 2,497,077 | Firing | Feb. 14, 1950 |